UNITED STATES PATENT OFFICE.

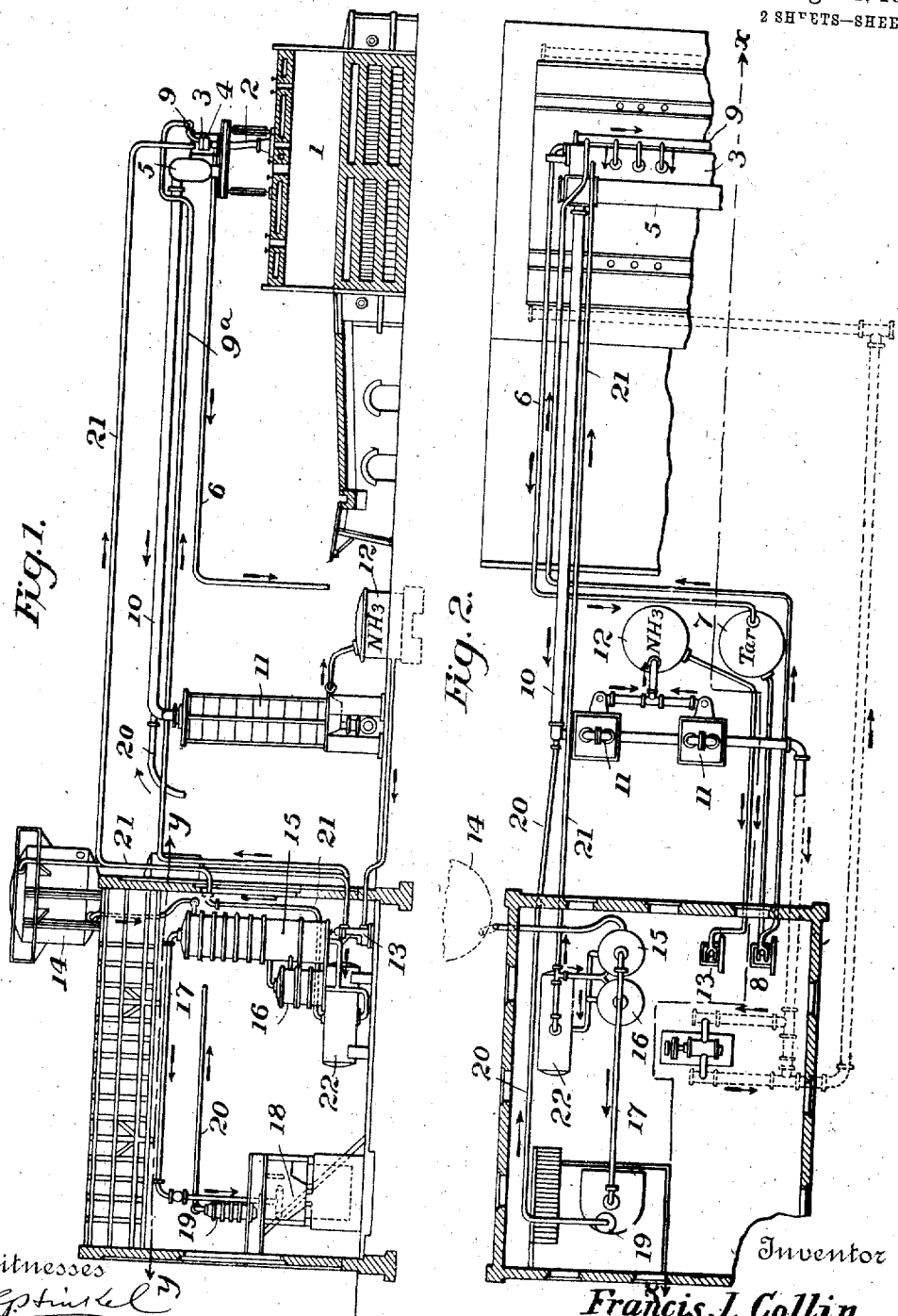

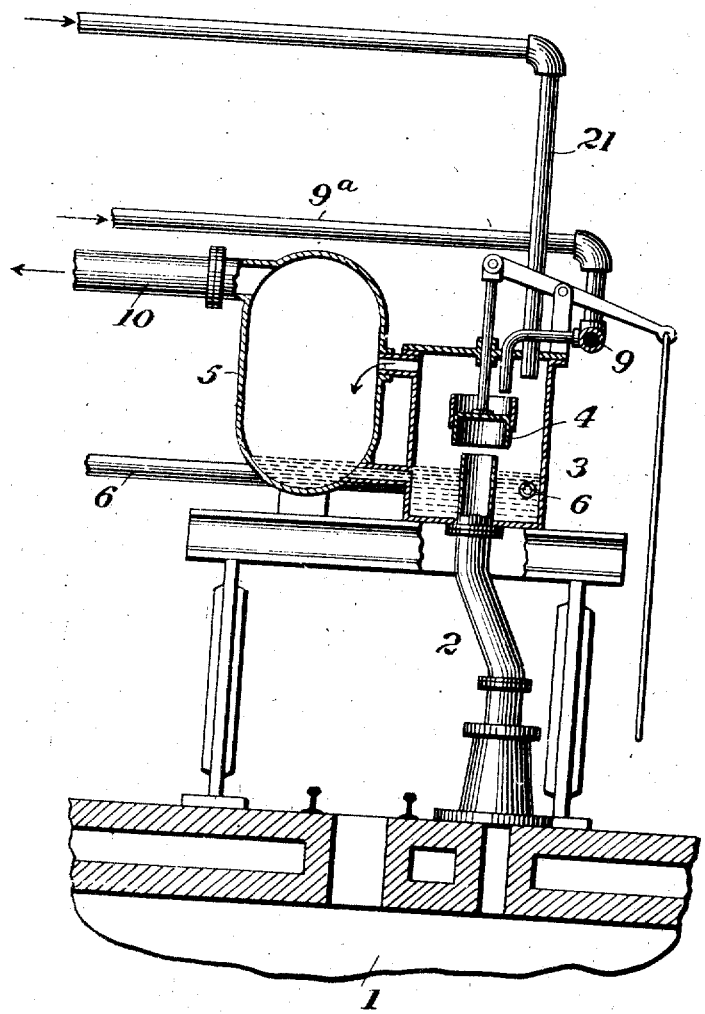

FRANCIS JOSEPH COLLIN, OF DORTMUND, GERMANY.

METHOD OF RECOVERING AMMONIA FROM COAL-GASES.

932,758.

Specification of Letters Patent. Patented Aug. 31, 1909.

Application filed March 13, 1909. Serial No. 422,279.

*To all whom it may concern:*

Be it known that I, FRANCIS JOSEPH COL-LIN, a subject of the Emperor of Germany, residing at Dortmund, Germany, have invented certain new and useful Improvements in Methods of Recovering Ammonia from Coal-Gases, of which the following is a specification.

In prior processes for the recovery of ammonia from coal-gases, the gases derived from the distillation of the coal were first cooled and then washed with water, acids, or special washing solutions, in scrubbers, towers, washers and like apparatus.

The object of this invention is to recover the ammonia by a more simple and economical method than heretofore, and furthermore to recover a much larger percentage of the ammonia contained in the gases than has heretofore been obtained in practice.

My invention will be understood from the following description, and its scope will be particularly pointed out in the claims.

For the purpose of illustrating one arrangement of gas pipes, apparatus and connections by which my invention may be carried out, reference may be had to the accompanying drawings in which—

Figure 1 is an elevation of apparatus arranged to carry out my invention, taken on the line $x$—$x$ of Fig. 2; Fig. 2, is a plan view thereof taken on the line $y$—$y$ of Fig. 1; and Fig. 3 is an enlarged detail view of a portion of said apparatus.

The gases from the coking-chamber 1 of each oven of a battery, are led directly into the bottom of a collecting gas-main 3 through the stand-pipes 2, the outlet of each of which stand-pipes, extends above the level of the condensates in the gas main 3. By means of adjustable bell-covers 4, situated inside of the gas-main, one over each stand-pipe, and each operated up and down by a lever mechanism in the usual manner, the amount and pressure of the gases entering the gas-main 3, from each oven, may be regulated or by lowering one of the bell-covers 4, the connection between any one coking-chamber 1, and the collecting gas-main 3, may be closed, the condensates in the gas-main acting as a liquid seal. By this means the heat of the entering gases keeps the condensates fluid and also generates steam from some of the condensed water which is sprayed over each bell-cover as hereafter described. From the gas-main 3, the gases next pass directly into a larger gas-collecting pipe 5, through small straight connecting pipes, one for each oven of the battery. The larger surface of the pipe 5 causes a cooling of the gases down to about 80° C. (176° F.) and the resulting condensates pass from pipe 5 into the gas-main 3, and from 3 the excess is delivered into reservoir 7 by means of the smaller pipe 6. In this reservoir the condensed tar and water separate by gravity; the condensed water is forced by the pump 8 back into a small pipe 9 near and parallel to the gas-collecting main 3; from this pipe, small branch pipes spray this condensed water over each of the bell-covers 4 in the gas-main 3. The somewhat cooled gases next pass from the large gas-collecting pipe 5 through pipe 10 into water-coolers 11, in which the gases are further cooled down to about 30° C. (86° F.) and a condensate obtained, containing practically all of the ammonia, both free and combined, originally contained in the gases; this ammoniacal liquor of a greater strength than usual is collected in the reservoir 12 and from which it is forced by the pump 13 into the overhead reservoir 14, from which latter it is fed into the still 15. In this still 15, the free ammonia is driven off by steam alone and conducted through the pipe 17 connecting the top of the still with the saturator 18 or similar apparatus for combining the ammonia gases with acid or the like. The steam and gases with ammonia-freed gases next pass into other condenser 19 and from this condenser the residual gases are conducted through pipe 20 into pipe 10 thus meeting the gases from the ovens, as they enter the water-coolers 11. From the gases on leaving the water-coolers, benzol may be recovered, or they may be drawn through exhausters and distributed in part to the ovens and the excess gas used for fuel, power gas or illuminating purposes.

To insure under all conditions of weather, etc., the excess of steam in the gas-main 3, necessary to this process for recovery of ammonia, a pipe 21 is provided bringing steam into the gas main 3 from the boiler 22, in which the condensate from which ammonia has been expelled is concentrated; a portion of the steam from boiler 22 is used in still 15 and in lime still 16.

In carrying out this invention, I utilize both the heat and the moisture contained in the gases as they leave the retorts or ovens, in such a manner as to so thoroughly saturate the gases in the collecting gas-main with steam, that practically all of the free ammonia is at once combined with the steam and recovered, together with the combined ammonia, on subsequently cooling the gases, as an ammoniacal liquor of greater strength than possible when using existing processes consisting of first cooling the gases without a prior saturation with steam, and then washing them in scrubbers, towers, washers and the like, and in which devices, water, acids or special washing solutions are employed.

For the purpose of utilizing the initial heat contained in the gases, I lead the gases into the bottom of the collecting gas-main through a vertical stand pipe directly connected with the retorts or ovens, and the outlet of which stand pipe extends slightly above the level of the condensates in the gas-main, the amount and pressure of the gases entering the gas-main being regulated by an adjustable bell-cover situated inside of the gas-main, operated by a lever mechanism in the usual manner, and capable of forming a liquid seal if desired. By this means the heat from the entering gases is transmitted directly to the condensate in the gas-main, and serves to generate steam from the water therein contained or from watery condensate purposely added, and which steam, mixing with the gases, causes the immediate formation, from the free ammonia present, of ammonium hydroxid, and thus prevents the loss of this volatile constituent. To insure the necessary excess of steam to fully accomplish this reaction, I may introduce an additional quantity of steam which may be derived from a subsequent operation as hereinafter described. Now by cooling the gases thus saturated with steam, in any convenient cooling device down to about 30° centigrade, I obtain a condensate containing practically all the free ammonia originally contained in the gases, as a strong ammonium hydroxid solution, together with an aqueous solution of the fixed ammonium compounds. I may use a portion of this condensate for the recovery of further quantities of free ammonia from the gases, and from the balance I drive off the free ammonia by subjecting the condensate to heat in a suitable apparatus, but I do not, in this operation, use any lime or other substance to disassociate the fixed ammonium compounds also present. The free ammonia thus liberated can be converted into ammonium sulfate or other salt by well-known processes, or condensed by compression into liquid ammonia.

If there is not enough water in the tarry condensate in the gas-main, to generate the maximum amount of steam possible by utilization of the heat contained in the entering gases, I may use fresh water or preferably the hot condensate containing the fixed ammonia compounds, or the condensate containing free and fixed ammonia can be used.

The surplus condensate containing the fixed ammonium compounds may be treated with lime in a still or other suitable device, and by which treatment free ammonia is generated and recovered by conversion into ammonium sulfate or other salt by well-known processes, or condensed by compression into liquid ammonia. After thus liberating the ammonia, this condensate may be further heated and the steam thus generated conducted in part into the gas-main, and in part used to drive off the free ammonia from the condensate which has been obtained by cooling the steam-saturated gases as they come from the gas-main.

Having now described the nature of my invention and the manner in which this new process can be best carried out, I claim as my invention—

1. The method of recovering ammonia from coal-gases, which consists in saturating the hot gases with steam immediately upon entering the gas-collecting main, and then cooling them to recover the contained ammonia.

2. The method of recovering ammonia from coal-gases, which consists in leading the gases into a suitable receptacle or gas main in such a manner as to subject the condensate in said gas main to the initial heat of said gases, thereby converting the water in the condensate into steam, saturating the gases with steam to combine with the free ammonia therein, and then separating the ammoniacal compounds by cooling.

In testimony whereof I affix my signature in presence of two witnesses.

FRANCIS JOSEPH COLLIN.

Witnesses:
LOUIS VANDORN,
BESSIE F. DUNLAP.